April 28, 1936.  E. K. ZIMMERMAN  2,038,977
WHEEL GUARD
Filed May 15, 1934    2 Sheets-Sheet 1
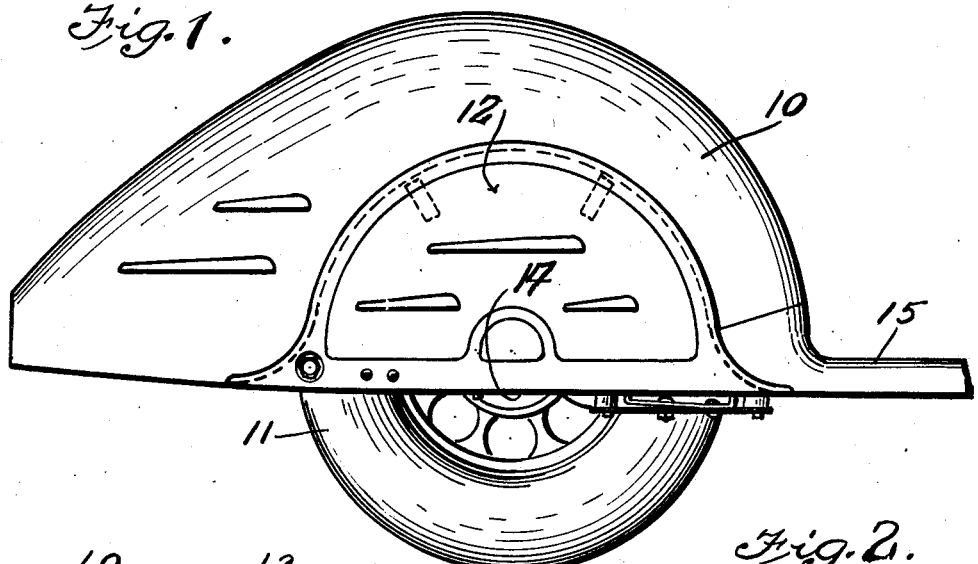
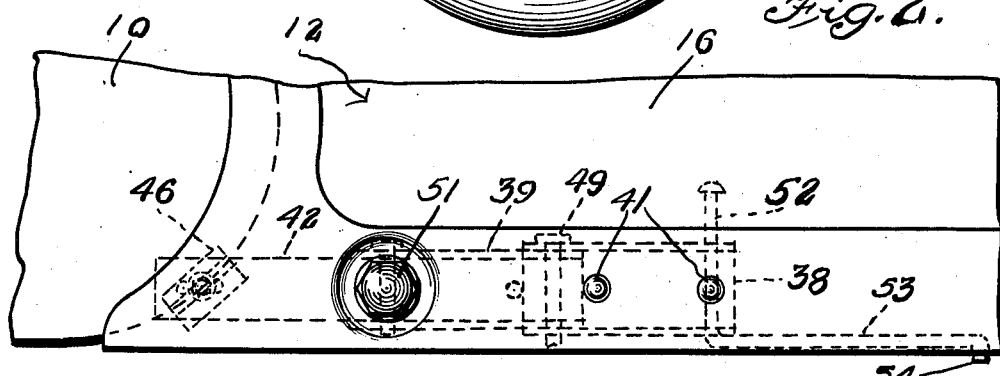
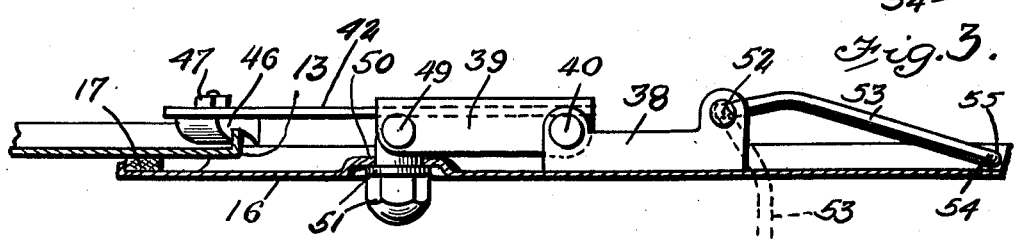
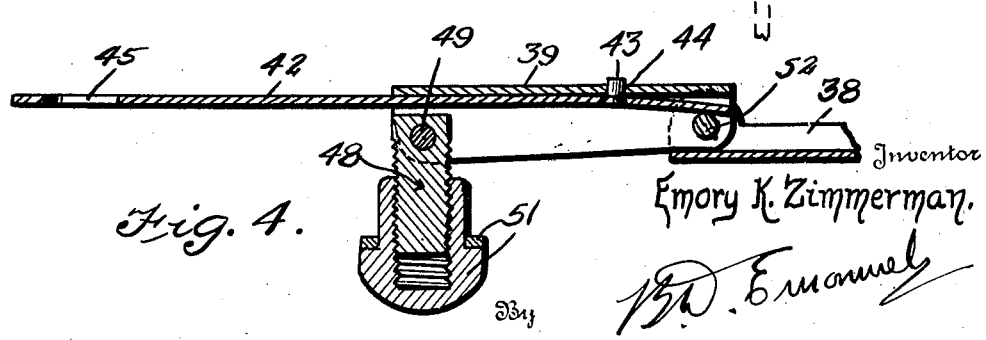
Inventor
Emory K. Zimmerman.

April 28, 1936.  E. K. ZIMMERMAN  2,038,977
WHEEL GUARD
Filed May 15, 1934  2 Sheets-Sheet 2
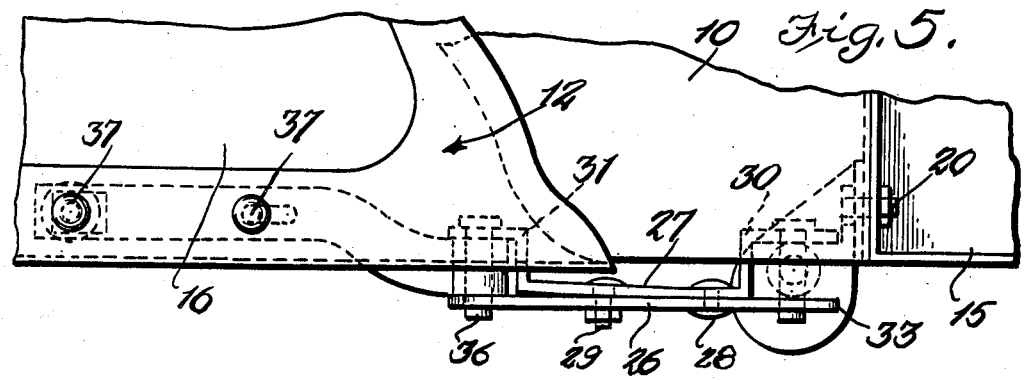
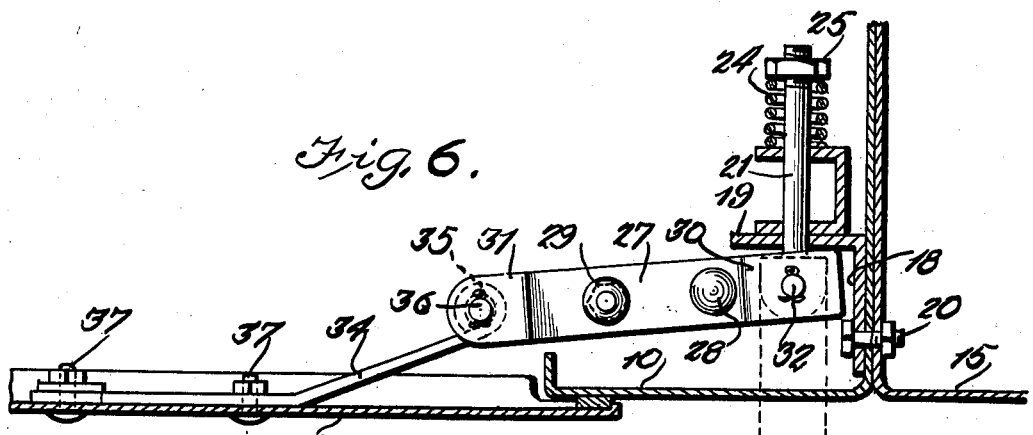
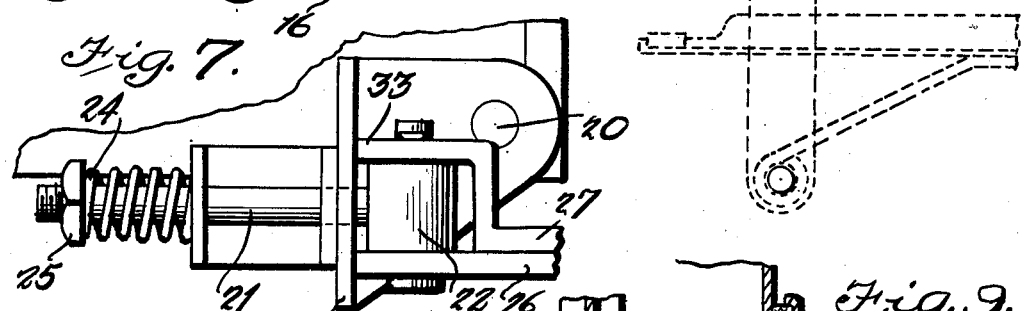
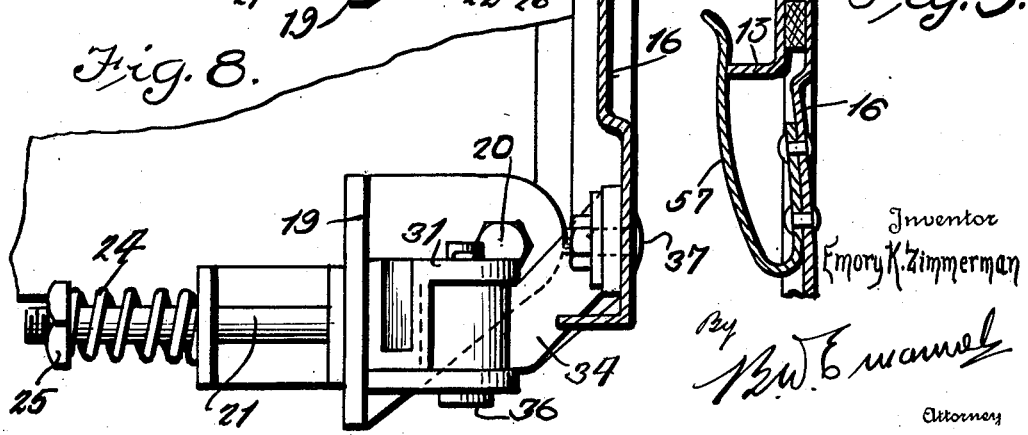
Inventor
Emory K. Zimmerman Patented Apr. 28, 1936

2,038,977

UNITED STATES PATENT OFFICE 2,038,977

WHEEL GUARD

Emory K. Zimmerman, Detroit, Mich., assignor to Aero-Style Corporation, Indianapolis, Ind., a corporation of Indiana Application May 15, 1934, Serial No. 725,789

11 Claims. (Cl. 280—153)

This invention relates to certain new and useful improvements in wheel guards.

The primary object of the invention is to provide a wheel guard that is associated with the fenders of automobile wheels for closing the side opening in the wheel fender and to overlie the upper half of the wheel to present a more complete fender appearance and acting to overcome wind resistance to the wheels.

A further object of the invention is to provide a wheel guard of the foregoing character embodying a substantially universal hinge mounting embodying adjustable elements to accommodate the mounting of the guard upon wheel fenders having side openings of varying dimensions and combined with a latch device to effect the rigid positioning of the guard for the elimination of vibrations and to present the appearance of a rigid fender construction.

It is a further object of the invention to provide a wheel guard hingedly mounted to a wheel fender for closing the side opening therein and embodying adjustable elements permitting the swinging or "drifting" movement of the guard from operative to inoperative position and when in the latter position to be disposed parallel to and adjacent the running board of the automobile to permit free access to the wheel for work of any character and to place the wheel guard in proximity of the automobile body to prevent damage thereto by passing automobiles or the like.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of an automobile wheel and fender with the wheel guard in position to close the side opening in the fender and to overlie the upper half of the wheel;

Figure 2 is an enlarged fragmentary side elevational view of a portion of the wheel guard and fender showing the latch device carried by the guard clampingly engaged with the lower edge of the fender;

Figure 3 is a longitudinal sectional view through the rear lower end of the guard and fender and showing the latch device;

Figure 4 is a fragmentary longitudinal sectional view of the latch device and the adjusting nut carried thereby;

Figure 5 is a fragmentary side elevational view of the front lower end of the wheel guard, fender and running board and showing the hinge connection between the wheel guard and fender;

Figure 6 is a fragmentary longitudinal sectional view showing the tensioned hinge arm for the support of the wheel guard, the arm and guard being illustrated by dotted lines in its laterally shifted inoperative position for completely exposing the automobile wheel;

Figure 7 is an elevational view showing the tensioned pivotal hinge mounting for the arm supporting the wheel guard;

Figure 8 is an elevational view of the hinge mounting for the wheel guard with a part of the wheel guard shown in section and further illustrating the bracket connection between the wheel guard and free end of the hinged arm; and Figure 9 is a detail sectional view showing a spring clip connection between the upper edge of the wheel guard and the fender.

Referring more in detail to the accompanying drawings and particularly to Figure 1, the reference character 10 designates an automobile wheel fender overlying the rubber tired wheel 11, the side opening in the fender 10 being closed by the wheel guard 12 that is of substantially semi-circular formation as illustrated. The upper edge of the wheel guard 12 is continuously curved and is complemental to the curved flanged edge 13 of the fender while the lower edge of the wheel guard extends in a substantially straight line as at 14 in the plane of the running board 15 and the rear lower edge of the fender.

The wheel guard 12 comprises a wall 16 that carries a marginal felt or like gasket 17 for contacting the outer face of the fender 10 to prevent injury to the finish thereof and said wheel guard is hingedly mounted to the fender at its lower forward corner edge with a latch device connecting the lower rear corner edge of the guard to the fender to effect a rigid mounting of the guard and to prevent vibration thereof. The hinge connection between the wheel guard and fender is shown more clearly in Figures 5 to 8 and includes an angle bracket comprising legs 18 and 19, the leg 18 anchored to the fender on the forward transverse wall thereof at its lower end by means of the usual bolt 20 for securing the latter to the running board 15 as shown in Figures 5 and 6, with the leg 19 perpendicularly disposed. A bolt 21 having a cross head 22 is passed through an opening in the leg 19 of the angle bracket, the bracket leg 19 having an angle guide 23 secured thereto through which the rod 21 extends and constituting an abutment for one end of a coil spring 24 surrounding the bolt outwardly of the guide with the other end of the spring engaged by the nut 25 threaded upon the end of the rod 21, the latter being tensioned by the spring. An arm comprising a pair of strap members 26 and 27 is hingedly connected at one end to the head 22 of the bolt 21, the strap members having a rivet connection 28 adjacent the head 22 and an adjustable connection 29 adjacent their other ends. The strap member 26 extends in a straight line while the opposite ends of the strap member 27 are of angle formation as at 30 and 31, the angle end 30 and adjacent end of the strap member 26 straddling the head 22 of the bolt and pivotally mounted thereon by means of a cross pin 32. The terminal ends of the angle end 30 and adjacent end of the strap member 26 are provided with cam surfaces 33 that ride upon the adjacent face of the bracket leg 19 for placing the arm under tension, the arm being movable through an arc of 90° as shown by full and dotted lines in Figure 6 and swingable through an arc centering on the bolt 21 to provide a substantially universal mounting for the arm.

A bracket arm 34 connects the free end of the hinge arm to the wheel guard 12 at the lower edge of the latter, one end of the bracket arm 34 having a barrel portion 35 positioned between the angle end 31 of the strap member 27 and adjacent end of the strap member 26 and is pivotally mounted upon the cross pin 36 being tensioned by the adjustable connection 29 between the strap members while the other end of the bracket arm 34 flatly engages the inner face of the wall 16 of the wheel guard and is adjustably connected thereto by the bolts 37 that permit vertical and horizontal adjustment of the wheel guard relative to the bracket arm to accommodate the positioning of the wheel guard relative to the side opening of the wheel fender 10. The adjustable bolt connection 29 between the strap members 26 and 27 of the arm causes the angle end 31 of the strap member 27 and adjacent end of the strap member 26 to be moved into binding engagement with the attached portion of the bracket arm 34 for holding the parts rigid for the elimination of vibration.

A latch connection is provided between the lower rear edge of the wheel guard and adjacent part of the fender and is shown more clearly in Figures 1 to 4. The latch device comprises a pair of channel-shaped straps 38 and 39 with their open sides opposed and having adjacent ends overlapped with a pivot pin connection 40 between the side flanges of the channel straps. The strap 38 is anchored as at 41 with its closed side contacting the inner face of the wall 16 of the wheel guard 12 and the strap member 39 has a limited range of pivotal movement upon the strap member 38. A spring arm 42 extends into the strap member 39 at the rear end thereof and carries a pin 43 receivable in an opening 44 in the bottom wall of the channel strap 39 with the free end of the spring arm 42 engaged with the pivot pin 40, the rear projecting end of the spring arm 42 is provided with an opening 45 as shown in Figure 4 that receives a bevelled nosed block 46 made rigid with the spring arm 42 by means of the nut 47, the block 46 being adapted for engagement with the adjacent flanged edge 13 of the fender 10 as shown in Figures 2 and 3. To lock the rear free edge of the guard wall in position and with the block 46 rigid or immovable relative to the fender, there is provided a stub screw 48 pivoted at one end as at 49 between the side walls of the channel straps 38 and 39 as shown in Figure 4 to project through a countersunk opening 50 in the lower edge of the wheel guard 12 for the reception of washer and tap screw combinations 51 that moves into engagement with the guard wall for moving the strap member 39 upon its pivotal connection 40 and causing the spring arm 42 and block 46 to be moved toward the wheel guard for binding engagement with the fender, all of which will be apparent from an inspection of Figure 3. The forward end of the strap member 38 has the angle end 52 of a rod 53 journalled in the side walls thereof with the opposite angle end 54 normally received in an opening 55 in the lower edge flange of the guard wall for purposes presently to appear.

As shown in Figures 1 and 9, one or more spring clips 57 are carried by the upper edge of the wall 16 of the wheel guard at the inner side thereof for snap and holding engagement with the flanged edge 13 of the fender.

The wheel guard 12 is illustrated in its operative position relative to the fender 10 and wheel 11 in Figure 1. When it is desired to displace the wheel guard relative to the wheel and fender to the dotted line position shown in Figure 6, the nut 29 carried by the strap members 26 and 27 of the hinged arm is loosened to permit pivotal movement of the bracket arm 34 on the strap members 26 and 27 and the nut 51 is also loosened to permit the bevelled nosed block 46 to be disengaged from the fender 10. The hinged arm connected to the head 22 of the bolt 21 is then depressed, causing rotation of the bolt 21 to disengage the spring clips 57 of the fender 10 as well as the fender gripping block 46, the arm being then swung upon its hinge pin 32 against the tension of the spring 24, the cam surfaces 33 riding over the leg 19 of the angle bracket and snapping into the dotted line position shown in Figure 6. The wheel guard is then further shifted by moving the bracket arm 34 upon its pivotal mounting 35—36 to position the guard wall adjacent to and parallel with the running board 15 of the automobile. The angle end 54 of the rod 53 is removed from the opening 55 and swung outwardly of the guard wall to be engaged with the running board 15 for supporting the rear free edge of the guard wall. When the wheel guard is in the operative position shown in Figure 1, it will be observed from an inspection of Figure 6 that the spring 24 tensions the arm hinged thereto for causing binding engagement between the wheel guard and outer side of the fender, this arrangement acting to prevent vibration of the wheel guard and cooperating with the spring arm 42 for holding the wheel guard rigidly assembled in relation to the fender. The adjustable bolt connection 37 between the bracket arm 34 and wheel guard compensates for irregularities or variance in the sizes of fender openings to accommodate the correct positioning of the wheel guard. It will also be observed that the wheel guard may be readily attached to wheel fenders of standard construction, the same being attached to the anchor bolt that secures the wheel fender to the running board and machine work or fitting of any kind is unnecessary.

While there is herein shown and described the preferred embodiment of the invention, it is nevertheless to be understood that minor changes may be made therein without departing from the spirit and scope of the invention as claimed.

I claim:—

1. In a wheel guard, the combination with a wheel fender, of a wheel guard wall hinged at one end to one end of the fender and means for removably and rigidly securing the other end of the guard wall in engagement with the fender.

2. In a wheel guard, the combination with a wheel fender, of a wheel guard wall shiftably hinged at one end to the fender, means for snugly retaining the guard wall in the fender opening, means carried by the upper edge of the guard wall for engagement with the fender and said hinge connection between the fender and guard wall permitting downward movement of the guard to disengage the upper end of the guard wall from the fender.

3. In a wheel guard, the combination with a wheel fender, of a wheel guard wall hinged at one end to the fender and means for snugly retaining the guard wall in the fender opening, the hinge connection including a tensioned pivoted arm supporting the guard wall at one end thereof for holding the guard wall bindingly engaged with the fender to prevent vibration of the guard wall.

4. In a wheel guard, the combination with a wheel fender, of a wheel guard wall hinged at one end to the fender, means for snugly retaining the guard wall in the fender opening, and means carried by the upper edge of the guard wall for engagement with the fender, the hinge connection including a tensioned pivoted arm supporting the guard wall at one end thereof for holding the guard wall bindingly engaged with the fender to prevent vibration of the guard wall and said hinge connection between the fender and guard wall permitting downward movement of the guard to disengage the upper end of the guard wall from the fender.

5. In a device of the character described, a wheel fender, a wheel guard wall hinged at its forward end to the fender and interlockingly engaged at its upper end with the fender, and a latch connection between the guard wall and fender, the hinge connection being universal in character to permit lowering movement of the guard wall to disengage the interlocking connection.

6. In a device of the character described, a wheel fender, a wheel guard wall hinged at its forward end to the fender, a latch connection between the guard wall and fender, and means carried by the upper edge of the guard wall for engagement with the fender, the hinge connection being universal in character to permit lowering movement of the guard wall to disengage the upper end of the guard wall from the fender.

7. In a wheel guard, the combination with a wheel fender, of a wheel guard wall hinged at its forward end to the fender, a latch connection between the rear end of the guard wall and fender, the hinge connection including a tensioned arm for holding the guard wall bindingly engaged with the fender to prevent vibration of the guard wall, and a member pivotally carried by the free end of the guard wall for supporting engagement with the running board of the vehicle when the guard wall is laterally shifted to expose the wheel.

8. In a wheel guard, the combination with a wheel fender, of a wheel guard wall hinged at its forward end to the fender, a latch connection between the rear end of the guard wall and fender, means carried by the upper edge of the guard wall for engagement with the fender, the hinge connection including a tensioned arm for holding the guard wall bindingly engaged with the fender to prevent vibration of the guard wall, and a member pivotally carried by the free end of the guard wall for supporting engagement with the running board of the vehicle when the guard wall is laterally shifted to expose the wheel.

9. In a wheel guard, the combination with a wheel fender, of a guard wall overlapping and complementary to the open side of the fender, a swivelled resilient hinge mounting for one end of the guard wall for holding the guard wall in either open or closed position and spring means associated with the other end of the guard wall and engageable with the adjacent end of the fender for holding the guard wall against vibratory movement when in closed operative position.

10. In a wheel guard of the character described, a wheel fender, a wheel guard wall adapted to close the side opening in the fender, a snap hinge mounting for the guard wall for holding the guard wall in closed position relative to the fender opening and in opened position laterally of the opening and means for holding the guard wall against vibratory movements when in closed position.

11. In a wheel guard for automobiles, a wheel fender, a guard wall to close the side opening in the fender, a swivelled resilient hinge mounting for the guard wall for holding the guard wall in closed position and in an open position laterally of the fender opening, and parallel to and adjacent the side of the automobile, an interlocking connection between the guard wall and fender and the swivelled mounting for the guard wall permitting initial movement of the guard wall relative to the fender for separating the interlocking connection whereby the fender may be moved to open position.

EMORY K. ZIMMERMAN.